No. 843,076. PATENTED FEB. 5, 1907.
J. S. DETRICK.
CLUTCH OPERATING MECHANISM.
APPLICATION FILED FEB. 15, 1904.
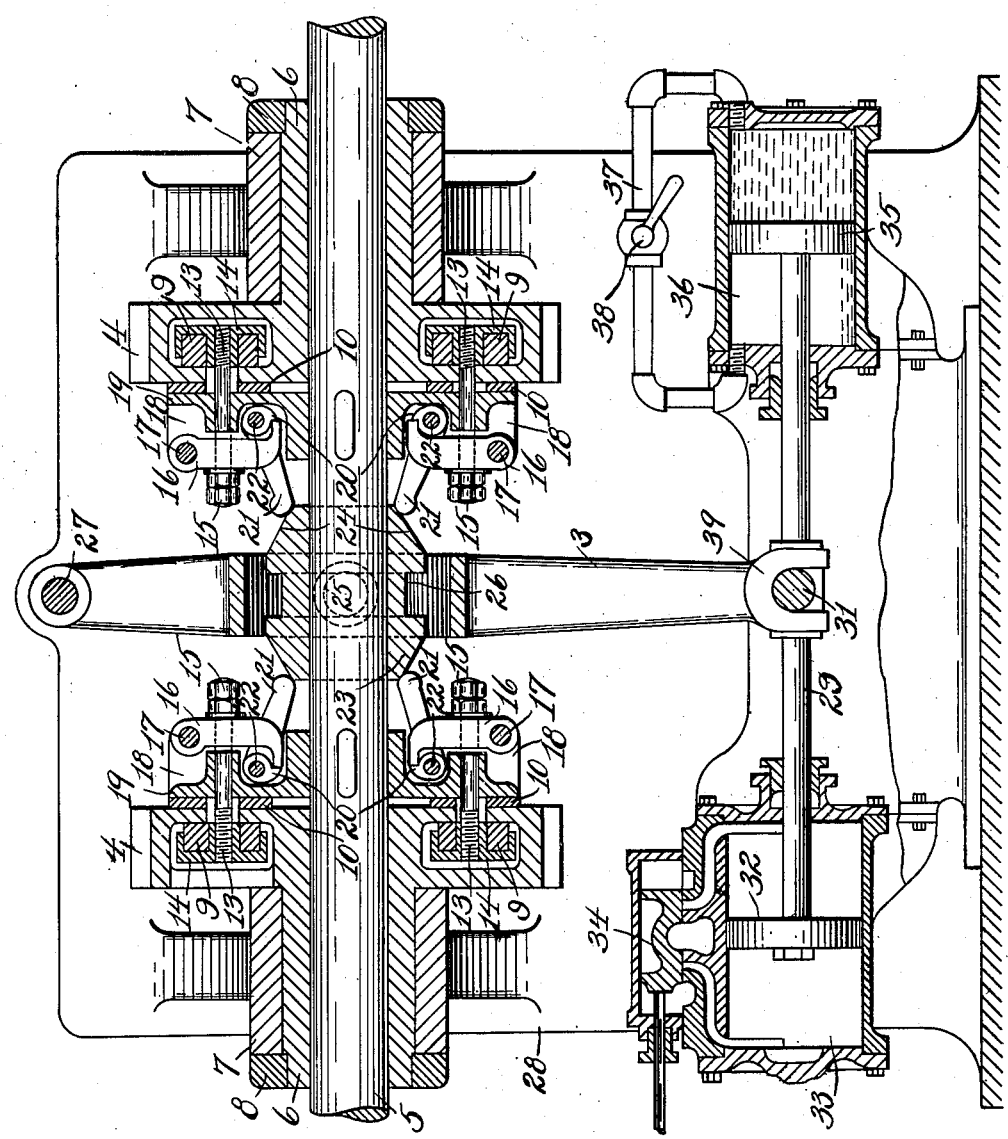
Witnesses:
Robert Adt
R. W. Pittman
Inventor:
Jacob S. Detrick.
By his Attorney,
F. A. Richards

UNITED STATES PATENT OFFICE.

JACOB S. DETRICK, OF BALTIMORE, MARYLAND.

CLUTCH-OPERATING MECHANISM.

No. 843,076.     Specification of Letters Patent.     Patented Feb. 5, 1907.

Application filed February 15, 1904. Serial No. 193,525.

*To all whom it may concern:*

Be it known that I, JACOB S. DETRICK, a citizen of the United States, residing in Baltimore, in the State of Maryland, have invented certain new and useful Improvements in Clutch-Operating Mechanism, of which the following is a specification.

While that operation of a clutch or like device which serves to break the rotative continuity between two parts can ordinarily be rapidly performed without injurious effect, it is oftentimes desirable under many circumstances that a reverse operation, serving to establish such continuity, shall take place at a relatively slow rate in order than the tendency to create injurious stresses shall be minimized.

The present invention relates to an organization of devices for operating a clutch in a manner such that the speed or rate at which the parts are brought from an initial or disconnected condition to their ultimate or connected condition may be made to occupy a period of sufficient duration to cause a gradual establishment of rotative continuity, and in the specific embodiment of the invention shown and described herein the operation of throwing in the clutch may by adjustment be made to consume a shorter or a longer period, as desired. Inasmuch, moreover, as the operation of throwing out the clutch may be practically instantaneous without injury the aforesaid embodiment is not designed to effect a prolongation of the time occupied in performing such act.

In the drawing accompanying the present specification the figure illustrates one embodiment of the present invention, this figure being mainly a sectional view illustrating an organization for accomplishing a slow throwing in of a clutch and a relatively more rapid throwing out of the same.

One feature of the present invention consists, essentially, in an organization of devices for accomplishing a relatively slow operation of a clutch for affecting the rotative continuity between two parts, and while there is represented a pair of clutches placed on opposite sides of a clutch actuator or lever (which in its full movement from one extreme position to the other accomplishes the disconnection of one part from a shaft and the connection of another part therewith) it is to be understood that by so illustrating a specific adaptation of the invention it is not contemplated that the general applicability of the latter shall be restricted to the particular one illustrated.

The present invention includes as one of its features means for exerting a retardant force in opposition to that movement of the clutch lever or actuator which in this instance accomplishes the throwing in or engagement of the clutch, and while, therefore, the force (here shown as exerted through the medium of a power-cylinder) urging the lever in such direction may be in amount such that without the retarding action of the retardant force the throwing in would occur at a more rapid rate than that at which it is desired it should take place the application of the retardant force precludes over-quick action.

Specifically, the aforesaid retardant force may arise from the throttled flow of a liquid. The cross-sectional area of the passage through which it is urged under the pressure of an advancing plunger or piston can preferably be regulated, whereby the desired rapidity with which the throwing-in movement of the clutch occurs may be obtained. During the reverse or throwing-out movement of the clutch actuator or lever its movement is not retarded by the restricted flow of the liquid, and hence such movement may occur comparatively rapidly.

Referring to the illustrated organization outlined above, 2 2 designates a pair of clutches illustrated in a conventional way and located upon opposite sides of a clutch actuator or lever 3 and serving in this instance to connect respective gear-wheels 4 4 with and disconnect them from a shaft 5. The gear-wheels are mounted loosely upon the shaft and are each provided with a hub 6, journaled in a corresponding bearing 7, within which the hub of the gear-wheel is restrained from longitudinal movement by the collar 8, secured to the hub.

It is apparent that I do not propose limiting the application of the present invention either to the use of gear-wheels and a shaft or to any particular construction of clutch. Suffice it here to say in explanation of the particular clutch construction illustrated that the same comprises pairs of opposed friction-rings 9 and 10, between which the web of the gear-wheel may be clamped by means of bolts 13, engaged at corresponding ends with respective heads 14, fitting over the rings 9, washers and nuts 15 at the other ends being seated upon levers 16, each pivoted at 17 to a proper bracket 18 on the clutch-body 19, (secured to the shaft,) the free end of the lever 16 engaging with a lug 20 on a lever 21, pivoted at 22 to said bracket. A collar 23 on the shaft 5 is provided at its ends with conical faces 24 24, which operate upon the levers 21 when forced thereagainst by the swinging clutch-operating lever 3 (this latter lever having one or more pins 25 entering a groove 26 in the collar) to wedge the levers 21 apart, and thereby firmly clamp the gear-wheel between the friction-rings and connect such gear-wheel with the clutch-body, and hence the shaft 5.

The clutch-operating lever 3 is here shown pivoted at 27 to a supporting-base 28, which constitutes one means of mounting the parts, and it is evident in the organization illustrated that when the lever is in a central position both clutches will have been thrown out and the two gear-wheels disconnected from the shaft 5. The movement of the lever from such position in either direction serves to engage the gear-wheel on that side toward which it moves with the shaft, while its movement from its extreme position at either side serves to first disconnect one gear-wheel from and then connect the other gear-wheel with the shaft.

At its swinging end the lever 3 is formed to engage with a rod 29, whose opposite ends are provided with pistons working in a power and a liquid cylinder, respectively. The lever 3 is shown as having a forked end 39, fitting over a cross-pin 31 on the rod 29. A piston 32 on the latter works within a power-cylinder 33, to which a pressure fluid may be admitted on one side or the other of the piston by the proper shifting of the controlling-valve 34. At the opposite end of the rod 29 is secured a piston 35, working in a liquid-cylinder 36, whose opposite ends are connected by a by-pass 37, provided with an adjustable throttling-valve 38. The liquid-cylinder is not, however, filled entirely full with a suitable liquid, since if it were the movement of the lever 3 from one extreme position to the other (during which movement, it will be understood, the throwing out of one clutch and the throwing in of the other occurs) would proceed at a substantially uniform rate—that is to say, if the space between the throttling-valve 38 and the face of the piston when the latter is at either end of the cylinder 36 is entirely filled with liquid the throwing out of one clutch will tend to take place no more rapidly than the throwing in of the other. A quantity of liquid is therefore put into the cylinder 36, such that when the piston 35 reaches its position midway of the cylinder end (corresponding to the middle position of the lever 3) the liquid in front of the advancing piston will have more or less begun to pass under the driving force of the piston through the restricted orifice of the throttling-valve. During the time, therefore, that the piston is advancing from one end—for instance, the left-hand end in the figure of the drawing—to substantially its middle position the retardant force retarding its forward movement is small in comparison with that occurring during the completion of its stroke to the right in the figure. From this it is evident that the clutch at the left in the figure will be thrown out rapidly, while as the piston advances the throwing-in movement of the clutch at the right will be comparatively slow, owing to the throttling action on the fluid as it is forced past the throttling-valve. During the more rapid movement of the piston the air in the liquid-cylinder and the by-pass 37 is simply forced from in front of the advancing piston and over the surface of the liquid to the rear side of the piston. A similar cycle of operations will occur when the parts are caused to move in the opposite direction through the shifting of the controlling-valve 34 for the purpose of changing the condition of the clutches.

The speed at which the throwing-in operation occurs may manifestly be regulated by the adjustment of the throttling-valve, while the lever 3 may be locked in its central position by closing the valve, assuming the conditions in the power-cylinder to be such as to maintain a pressure on the inclosed liquid.

Heretofore duplex clutch mechanism operated by the shifting of a lever in opposite directions from an intermediate position has been controlled by means of resilient members or springs arranged on both sides of the lever, so that when shifted in either direction from such intermediate position a spring would be compressed; but this construction has the disadvantage that the spring being placed under tension, if the lever is permitted to act freely, this spring will react and shift the lever back to the intermediate position and throw out the clutch. Either the large amount of friction must be provided in the clutch or else a special locking mechanism arranged to prevent this reaction of the spring. With this construction of applicant, as herein set forth, this objectional feature is entirely overcome, as the retarding means that retard the movements of the lever in either direction from its intermediate position is absolutely without any reactive tendency of power tending to return the lever to the normal intermediate position and throw out the clutch. At the same time the lever is entirely free to be moved from either of its end positions to the intermediate position, throwing out the clutch.

Having thus described my invention, I claim—

1. A clutch-operating mechanism having means for retarding the throwing-in movement of the clutch while permitting the relatively rapid throwing-out movement thereof, such means comprising a liquid-cylinder partially filled with liquid, a piston therein, and throttled means connecting said cylinder at opposite sides of said piston.

2. In a clutch-operating mechanism, the combination of a clutch; a clutch-actuator; a cylinder partially filled with liquid; a piston, one of which latter two members is connected to said actuator; and means for throttling the flow of a liquid in said cylinder induced by the movement of the actuator, the organization being such that the throwing-in movement of the clutch is retarded, while the throwing-out movement thereof is comparatively rapid.

3. In a clutch-operating mechanism, the combination of a clutch; a clutch-actuator; a piston; a liquid-cylinder partially filled with liquid, to one of which latter two members said actuator is connected; and a throttled by-pass connecting one end of the cylinder with the other, the organization being such that the throwing-in movement of the clutch is relatively slow while the throwing-out movement thereof is comparatively rapid.

4. In a clutch operating mechanism the combination of a clutch; a clutch-actuator; a power-cylinder and piston; a liquid-cylinder partially filled with liquid, and a piston, said actuator being connected with the corresponding parts of both power and liquid pistons and cylinders; a by-pass leading from one end of the liquid-cylinder to the other; and a throttling device in such by-pass, the organization being such that the throwing-in movement of the clutch is retarded while the throwing-out movement thereof is comparatively rapid.

5. The combination of a clutch; a clutch-operating lever; a power-cylinder provided with a piston; a liquid-cylinder partially filled with liquid and provided with a piston, said pistons being connected by a piston-rod and said lever being connected with said piston-rod; a by-pass leading from one end of the liquid-cylinder to the other; and a throttling device in such by-pass, the organization being such that the throwing-in movement of the clutch is relatively slow, while the throwing-out movement thereof is comparatively rapid.

6. The combination with a clutch and a clutch-actuator, of means comprising a liquid-cylinder partially filled with liquid, a piston therein, and a throttled by-pass connecting the ends of said cylinder, for effecting a slow throwing-in movement of the actuator and a rapid throwing-out movement thereof.

7. The combination with a clutch and a clutch-actuator, of a power-cylinder for actuating the latter; and fluid-controlled means for retarding the action of said power-cylinder during the throwing-in movement of the actuator from which retarding action the power-cylinder is freed during the throwing-out movement by the means for retarding the action of the power-cylinder.

8. The combination with a clutch and a clutch-operating lever, of a power-cylinder for actuating the lever; and means for retarding the action of said power-cylinder during the throwing-in movement of the actuator from which retarding action the power-cylinder is freed during the throwing-out movement by the means for retarding the action of the power-cylinder, said means comprising a liquid-cylinder partially filled with liquid, a piston, and a throttled by-pass connecting the ends of the cylinder.

9. The combination with a pair of clutches, of a clutch-actuator adapted during a full movement to throw out one clutch and throw in the other; a power-cylinder for actuating the actuator; and a fluid-controlled retarding device connected with said lever and effective to secure a relatively rapid throwing-out movement of one clutch, and a relatively retarded throwing-in movement of the other clutch.

10. The combination with a pair of clutches, of a clutch-actuator adapted during a full movement to throw out one clutch and throw in the other; a power-cylinder for actuating the actuator; a piston connected with said actuator, said piston working in a cylinder partially filled with liquid; and a throttled by-pass connecting the opposite ends of the latter cylinder.

11. The combination of a shaft; a pair of clutches disposed longitudinally of the shaft; a lever mounted between the clutches and adapted to operate the clutches; a power-cylinder and a liquid-cylinder partially filled with liquid; and each provided with a piston; a piston-rod connecting the two pistons and to which said lever is connected; a by-pass connecting the opposite ends of said liquid-cylinder; and a throttling device in said by-pass.

12. The combination with a shaft, of a pair of gears mounted thereon; a pair of clutches for connecting the gears with and disconnecting them from said shaft; a clutch-operating lever mounted between said clutches; a collar mounted on said shaft for operating the clutches and with which collar said lever connects; a power-cylinder and a liquid-cylinder each provided with a piston; a piston-rod connecting said pistons and to which said lever is connected; a by-pass connecting the opposite ends of the liquid-cylinder; a throttling device interposed in said by-pass; and a body of liquid in said liquid-cylinder less in volume than the cubic contents of the cylinder and said by-pass.

13. A duplex clutch mechanism having means for effecting a relatively slow throwing-in movement of one clutch while permitting a relatively rapid throwing-out movement of the other clutch, said means comprising a cylinder partially filled with liquid, a piston therein, and a throttled by-pass connecting said cylinder at opposite sides of said piston.

14. The combination with a clutch and operating mechanism therefor, of means organized to retard the throwing-in movement of the clutch without affecting in any manner the throwing-out movement thereof.

15. The combination with a clutch and operating mechanism therefor, of means for uniformly retarding the entire throwing-in movement of the clutch without affecting in any manner the throwing-out movement of the clutch.

16. The combination with a clutch and operating mechanism therefor, of a fluid-controlled device organized to retard the throwing-in movement of the clutch without affecting the throwing-out movement thereof.

17. The combination with a clutch and operating mechanism therefor, of a liquid-controlled device organized to uniformly retard the entire throwing-in movement of the clutch without affecting in any manner the throwing-out movement thereof.

18. The combination with a duplex clutch mechanism and a common operating member therefor, of means connected with the operating member and organized to retard the throwing-in movement of each clutch without affecting the throwing-out movement of the clutch.

19. The combination with a duplex clutch mechanism and a common operating member therefor, of means connected with the operating member and organized to uniformly retard the entire throwing-in movement of each clutch without affecting the throwing-out movement of the clutch.

20. The combination with a duplex clutch mechanism, and a common operating member therefor organized to throw in one clutch when advanced from an intermediate position and to throw in the other clutch when advanced in the opposite direction from said intermediate position, both clutches being thrown out when the member is in such intermediate position of means connected with said member and organized to retard the throwing-in movement of the member in each direction from said intermediate position without affecting the throwing-out movement of the member from either position to the intermediate position.

21. The combination with a duplex clutch mechanism, and a common operating member therefor organized to throw in one clutch when advanced from an intermediate position and to throw in the other clutch when advanced in the opposite direction from said intermediate position, both clutches being thrown out when the member is in such intermediate position, of a fluid-controlled device connected with said member and organized to retard the throwing-in movement of the member in each direction from said intermediate position without affecting the throwing-out movement from each direction to return to the intermediate position.

JACOB S. DETRICK.

Witnesses:
J. WM. NEIDHARDT,
JAS. C. MCGRATH.